United States Patent
Ponyavin et al.

(10) Patent No.: US 8,932,004 B2
(45) Date of Patent: *Jan. 13, 2015

(54) INLET BLEED HEAT SYSTEM

(75) Inventors: Valery Ivanovich Ponyavin, Greenville, SC (US); Hua Zhang, Greer, SC (US)

(73) Assignee: General Electric Company, Schnectady, NY (US)

( * ) Notice: Subject to any disclaimer, the term of this patent is extended or adjusted under 35 U.S.C. 154(b) by 640 days.

This patent is subject to a terminal disclaimer.

(21) Appl. No.: 13/291,201

(22) Filed: Nov. 8, 2011

(65) Prior Publication Data

US 2013/0115061 A1    May 9, 2013

(51) Int. Cl.
- *F01D 25/10* (2006.01)
- *F02C 7/057* (2006.01)
- *F02C 7/045* (2006.01)
- *F02C 7/047* (2006.01)

(52) U.S. Cl.
CPC .................. *F02C 7/057* (2013.01); *F02C 7/045* (2013.01); *F02C 7/047* (2013.01)
USPC .......................................................... 415/58.5

(58) Field of Classification Search
USPC ...................... 415/52.1, 58.4, 58.5, 58.6, 58.7
See application file for complete search history.

(56) References Cited

U.S. PATENT DOCUMENTS

| | | | |
|---|---|---|---|
| 5,491,308 A * | 2/1996 | Napier et al. | 181/224 |
| 7,841,186 B2 | 11/2010 | So et al. | |
| 2010/0232945 A1* | 9/2010 | Zhang et al. | 415/177 |

* cited by examiner

*Primary Examiner* — Richard Edgar
(74) *Attorney, Agent, or Firm* — Ernest G. Cusick; Frank A. Landgraff (57) ABSTRACT

An embodiment of the present invention takes the form of an IBH system that has two conduits, which are positioned close to a downstream end of a silencer section. This arrangement may reduce the overall pressure drop associated with the inlet system. This arrangement may also promote a substantially uniform mixing between the cooler ambient air and the warmer heated air.

22 Claims, 4 Drawing Sheets

INLET BLEED HEAT SYSTEM

BACKGROUND OF THE INVENTION

This application is related to commonly-assigned U.S. patent application Ser. No. 12/403,444, filed Mar. 13, 2009; and a concurrently filed GE application having Ser No. 13/291,208, filed herewith on Nov. 8, 2011.

The present invention relates to a combustion turbine engine and, more particularly, to an inlet heating system for a combustion turbine engine.

During some turbine operations, the turbine pressure ratio may reach an operating pressure ratio limit of the compressor. This may cause a compressor surge. The compressor pressure ratio may be larger than the turbine pressure ratio due to pressure losses across the combustor. Compressor pressure ratio protection typically involves bleeding and re-circulating discharge air to the compressor inlet. This operation, known as inlet bleed heat (IBH) control, also raises the temperature of the compressor inlet by mixing cooler ambient air with the bleed portion of the hot compressor discharge air.

Conventionally, to maintain compressor inlet temperatures within a small range, a large number of vertical manifolds are arranged between the bleed air and the compressor inlet. While the vertical manifolds provide mixing in the horizontal plane, temperature gradients can remain within the bleed air. This may make it difficult to maintain the compressor inlet temperature within the small range. Furthermore, a large number of vertical manifolds lead to a costly installation and maintenance processes.

For the foregoing reasons, there is a need for a simpler IBH system that reduces the temperature gradients. The system should use require fewer components and reduce the overall pressure drop across the inlet system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment of the present invention, a system comprising: a compressor including a compressor inlet and a compressor extraction outlet; an inlet system fluidly connected to the compressor, the inlet system including: a plenum including a first end portion that extends to a second end portion through an intermediate portion; the first end portion is orientated in a direction substantially parallel to a centerline of the compressor and defines an inlet for receiving ambient air; and the second end portion is orientated in a direction substantially perpendicular to the centerline of the compressor and defines an outlet that directs the ambient air towards the compressor inlet; and a silencer fluidly connected within the inlet system and orientated such that an upstream portion faces the first end portion and a downstream portion faces the second end portion; and a heating system including two conduits located within the second end portion and adjacent to the silencer, wherein the two conduits extend horizontally through the second end portion and are arranged in a substantially horizontal relationship, each conduit includes a first end section, a second end section and an intermediate section, at least one of the first and second end sections is fluidly connected to the compressor extraction outlet, wherein heated air from the compressor extraction outlet passes through the two conduits and raises a temperature of ambient air passing through the plenum and then into the compressor inlet.

In accordance with a second embodiment of the present invention, a turbomachine comprising: a compressor including: a compressor inlet, a compressor extraction outlet, and inlet guide vanes; a turbine section fluidly located downstream of the compressor extraction outlet; an inlet system fluidly connected to the compressor, the inlet system including: an inlet filter house that receives ambient air; a plenum fluidly connected to an aft end of the inlet filter house, wherein the plenum includes a first end portion that extends to a second end portion through an intermediate portion; the first end portion is orientated in a direction substantially parallel to a centerline of the compressor and defines an inlet for receiving the ambient air; and the second end portion is orientated in a direction substantially perpendicular to the centerline of the compressor and defines an outlet that directs the ambient air towards the compressor inlet; and a silencer fluidly connected within the inlet system and orientated such that an upstream portion faces the first end portion and a downstream portion faces the second end portion; and a heating system including two conduits located within the second end portion and adjacent to the silencer, wherein the two conduits extend horizontally through the second end portion and are arranged in a substantially horizontal relationship, each conduit includes a first end section, a second end section and an intermediate section, at least one of the first and second end sections is fluidly connected to the compressor extraction outlet, wherein heated air from the compressor extraction outlet passes through the two conduits, raising a temperature of ambient air passing through the plenum and then into the compressor inlet.

BRIEF DESCRIPTION OF THE DRAWINGS

These and other features, aspects, and advantages of the present invention may become better understood when the following detailed description is read with reference to the accompanying figures (FIGS) in which like characters represent like elements/parts throughout the FIGS.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

The present invention may be applied to the variety of combustion turbine engines that compress an ingested air, such as, but not limiting of, a heavy-duty gas turbine; an aero-derivative gas turbine; or the like. An embodiment of the present invention may be applied to either a single combustion turbine engine or a plurality of combustion turbine engines. An embodiment of the present invention may be applied to a combustion turbine engine operating in a simple cycle or combined cycle.

An embodiment of the present invention takes the form of an IBH system that has two conduits, which are positioned close to a downstream end of a silencer section. This arrangement may reduce the overall pressure drop associated with the inlet system. This arrangement may also promote a substantially uniform mixing between the cooler ambient air and the warmer heated air. The elements of the present invention may be fabricated of any material that can withstand the operating environment under which embodiments of the present invention may operate.

Figure 1:
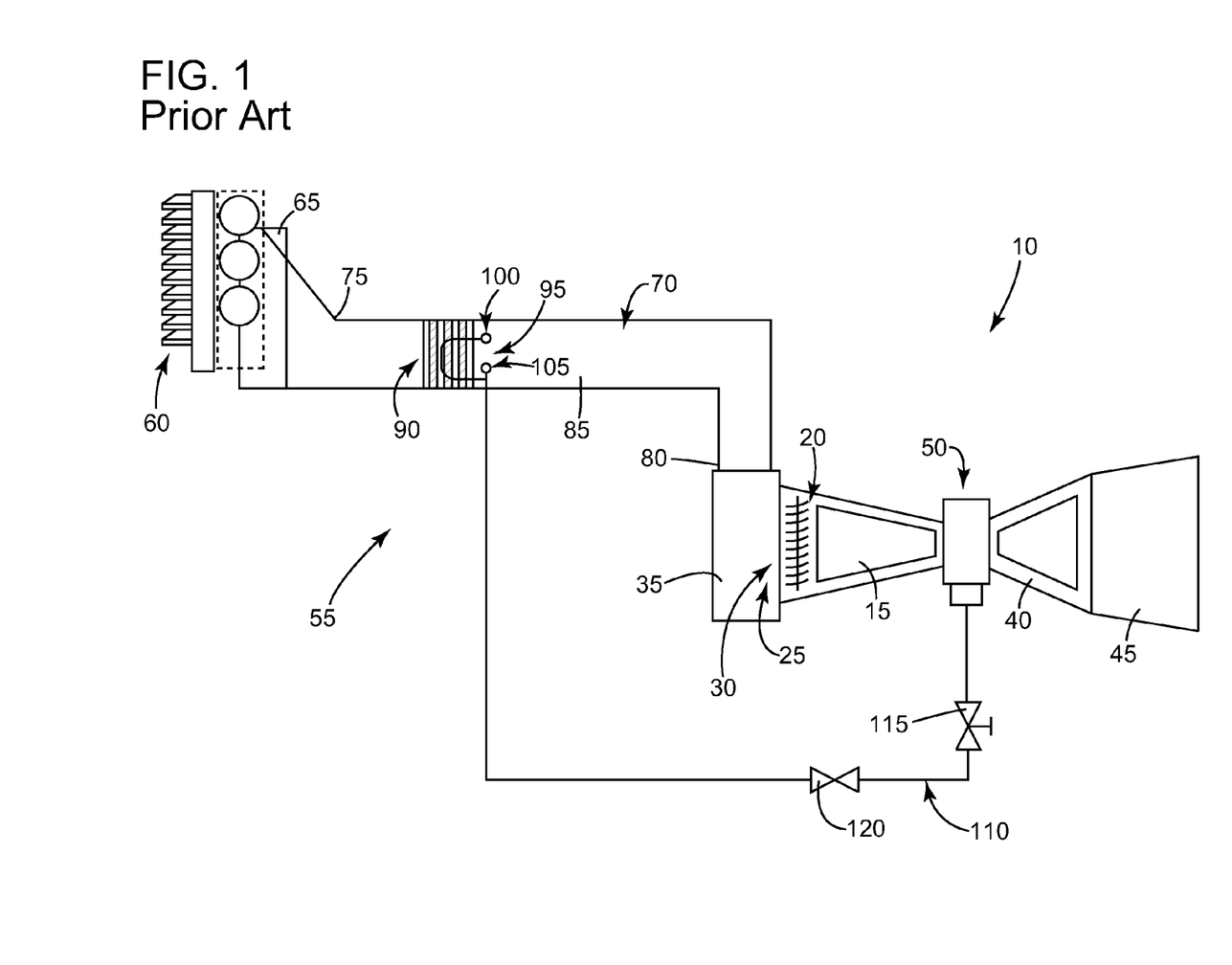
FIG. 1 is a schematic illustrating a known environment in which an embodiment of the present invention may operate.

Referring now to the Figures, where the various numbers represent like elements throughout the several views, FIG. 1 is a schematic illustrating a known environment in which an embodiment of the present invention may operate. FIG. 1 illustrates a combustion turbine engine 10, an inlet system 55, and an IBH system 95.

The combustion turbine engine 10 generally comprises a compressor 15, and a turbine section 40. The compressor 15 includes a compressor inlet 30. The compressor inlet 30 may include a plurality of inlet guide vanes (IGVs) 20 arranged downstream of an inlet plenum 35. The combustion turbine engine 10 also generally includes a turbine section 40 fluidly connected to an exhaust diffuser 45. As illustrated in FIG. 1, the compressor 15 is operatively linked to turbine section 40 through an extraction manifold 50.

The inlet system 55 generally comprises a weather hood 60 mounted to an upstream end of an inlet filter house 65. The weather hood 60 is fluidly connected to inlet plenum 35 via a plenum 70. Plenum 70 includes a first end portion 75 that extends to a second end portion 80 through an intermediate portion 85. The first end portion 75 may be orientated in a direction substantially parallel to a centerline of the compressor 15 and defines an inlet for receiving ambient air. The second end portion 80 may be orientated in a direction substantially perpendicular to a centerline of the compressor 15 and defines an outlet that directs the ambient air towards the compressor inlet 30.

Figure 3:
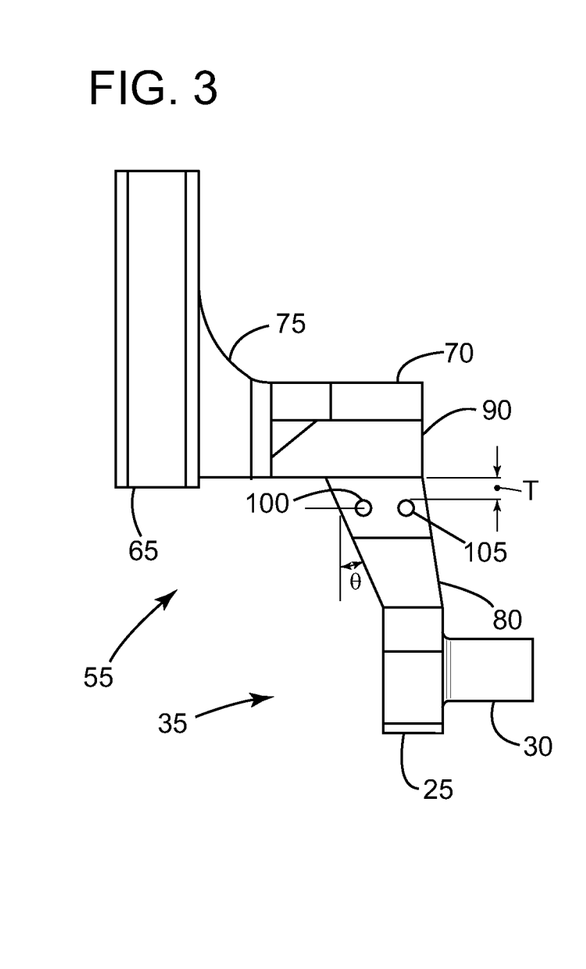
FIG. 3 is a schematic illustrating an elevation view of an inlet system, in accordance with an embodiment of the present invention.
Figure 4:
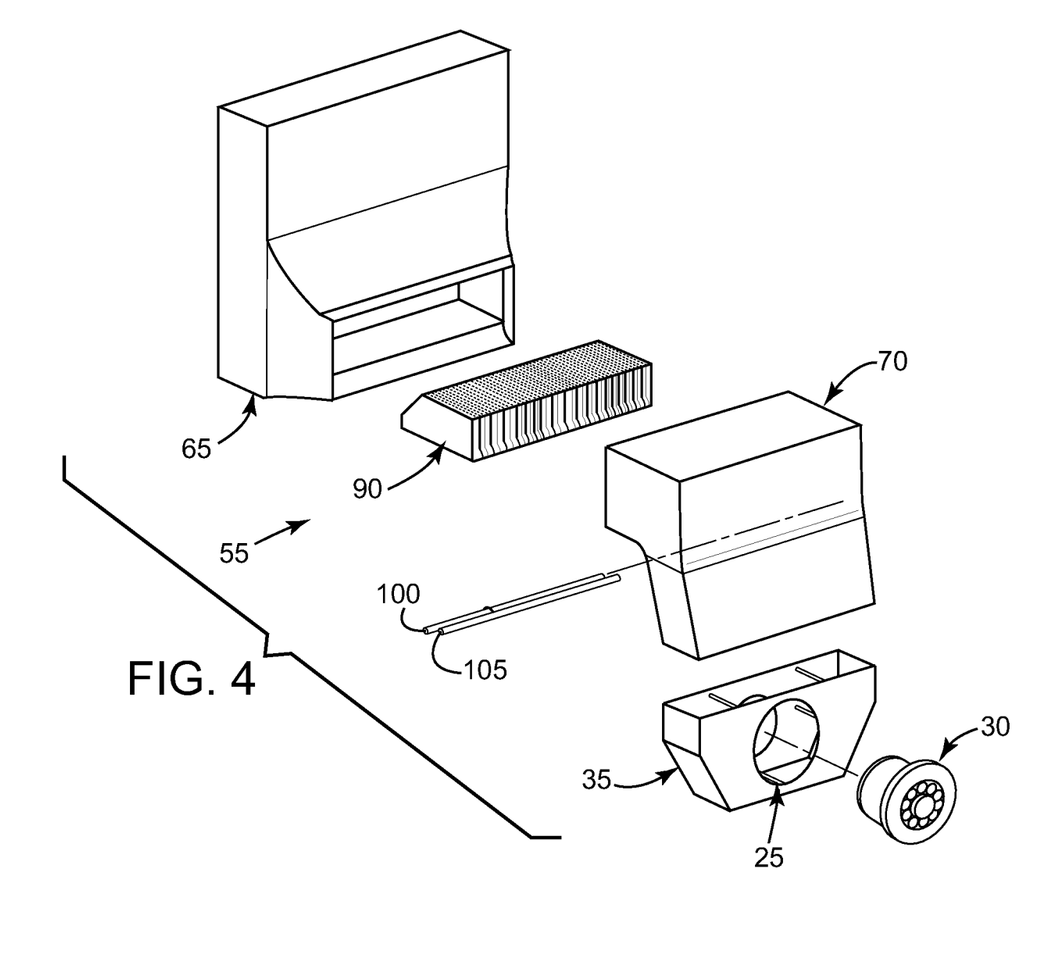
FIG. 4 is a schematic illustrating an exploded isometric view of the inlet system of FIG. 3.

The inlet system 55 also include an inlet silencer 90 arranged downstream from inlet filter house 65; and an IBH system 95 arranged downstream from inlet silencer 90. The second portion 80 are fluidly connected to the diffuser 25 and compressor inlet 30, both are which are adjacent to the inlet plenum 35. These components are also illustrated in FIG. 2 through 4.

The IBH system 95 includes a first conduit 100 that establishes a vertical curtain of heated air within the plenum 70. IBH system 95 also includes a second conduit 105 that also establishes a vertical curtain of heated air within the plenum 70.

First and second conduits 100 and 105 may be fluidly connected to the extraction manifold 50 via an IBH delivery conduit 110. The conduit 110 includes associated piping that fluidly connects the extraction manifold 50 to the first and second conduits 100, 105. IBH delivery conduit 110 may also include an isolation valve 115 and a control valve 120. Operationally, the isolation valve 115 delivers a heated air flow to IBH system 95 to establish a curtain of heated air within the plenum 70.

Figure 2:
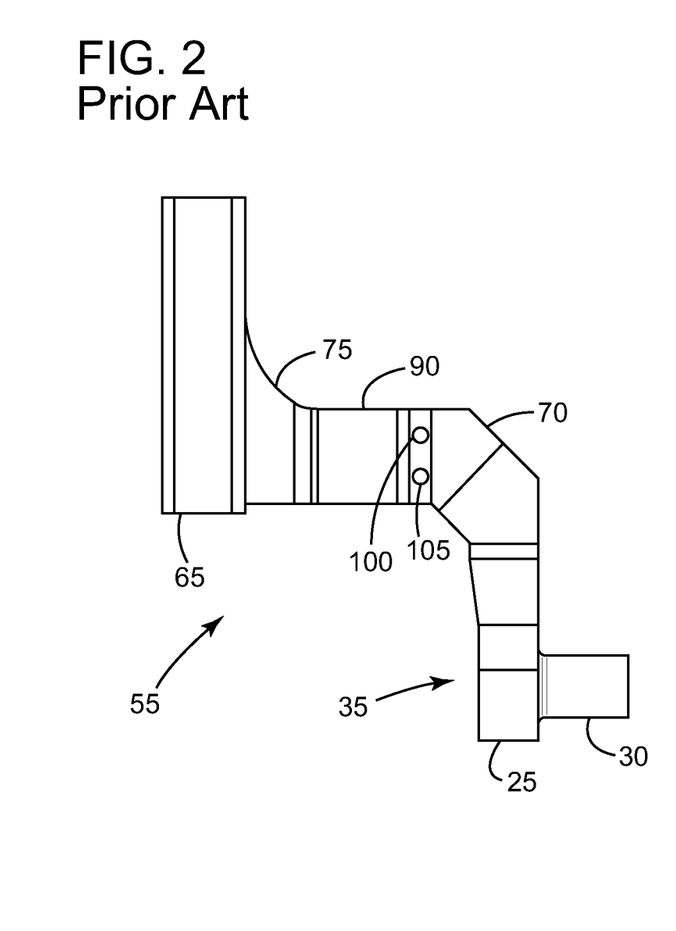
FIG. 2 is a schematic illustrating an elevation view of a known inlet system.

FIG. 2 is a schematic illustrating an elevation view of a known inlet system 55. FIG. 2 illustrates the arrangement of the first and second conduits 100,105 of the IBH system 95. Here, the conduits 100,105 may be considered to be arranged in a horizontal plane in a vertical orientation. In contrast, FIG. 3 is a schematic illustrating an elevation view of an inlet system 55, in accordance with an embodiment of the present invention. Here, the conduits 100,105 may be arranged in a horizontal plane in a horizontal orientation. Furthermore, the conduits 100,105 may be located on the second end portion 80 of the plenum 70. However, in FIG. 2, the conduits 100, 105 are located in the intermediate portion 85.

FIG. 3 also illustrates that the inlet silencer 90 comprises a different shape and orientation from that of FIG. 2. In FIG. 3, the inlet silencer 90 may be orientated in a manner that is substantially parallel to the compressor 15. However, in FIG. 2, the inlet silencer 90 is orientated in a manner that is substantially perpendicular to the compressor 15.

As the heated air engages the cooler ambient air, space is required to ensure adequate mixing of these fluids. This space may be considered the mixing distance. The shape and orientation of the inlet silencer 90, coupled with the orientation and location of the conduits 100,105, may allow for a significant reduction in the mixing distance. This may, in-turn, reduce the overall pressure drop across the inlet system 55. Theta "θ", illustrated in FIG. 3, represents the angular orientation of an axial center of the conduit 100 to the vertical portion of the second end portion 80 of the plenum 70. In an embodiment of the present invention, θ may have a range of up to 90 degrees.

FIG. 3 also illustrates the distance between the conduits 100,105 and a downstream end of the inlet silencer 90 as a distance "T". In an embodiment of the present invention distance "T" may comprise a range of up to 10 inches.

FIG. 4 is a schematic illustrating an exploded isometric view of the inlet system 55 of FIG. 3. FIG. 4 illustrates how components of an embodiment of the inlet system 55 may be structurally connected as the ambient air and recirculated heated air, travel therein. Here, the ambient air, represented by an arrow, enters the inlet filter house 65, flows through the inlet duct 67 and then into an upstream portion of the inlet silencer 90. The heated air discharging from the conduits 100,105 may also enter the inlet silencer 90. As these fluids mix, the air flows through the inlet plenum 35, the diffuser 25, and then the compressor inlet 30.

FIG. 4 also illustrates the L-like shape of which an embodiment of the inlet silencer 90 may be formed. This shape may allow the upstream portion of the inlet silencer 90 to face the inlet duct 67 and/or the first end portion 75 of the plenum 70. Also, this shape may allow the downstream portion of the inlet silencer 90 to face the inlet plenum 35 and/or the second end portion 80 of the plenum 70. In an embodiment of the present invention, the inlet silencer 90 may be located within the inlet duct 67. In an alternate embodiment of the present invention, the inlet silencer may be located near the inlet duct 67.

FIGS. 5-8 collectively illustrate different embodiments or physical arrangements of the two conduits 100,105. It has been found that the use of only two conduits 100,105, arranged along a horizontal plane and in a horizontal orientation relative to one another, may exchange sufficient heat with the inlet air flow. As discussed, embodiments of the present invention may be orientated differently from the Figures. The different orientations may include, but is not limited to, substantially horizontal, substantially vertical, or any combination thereof.

Embodiments of the present invention provide an IBH arrangement that may enhance operation of the combustion turbine engine 10, without creating significant impact on the reliability of the compressor 15. Furthermore, the IBH manifolds, 500, 600, 700, and 800 may sufficiently elevate the temperature of the ambient air, with minimal thermal gradients within the inlet system 55 and compressor inlet 30.

Each IBH manifold 500, 600, 700, and 800 includes a plurality of outlet openings 505. In an embodiment of the present invention, the openings 505 may be orientated substantially perpendicular to an adjacent wall of the plenum 70. This may provide optimum mixing of the ambient air and the recirculated heated air. However, it is not the intent to limit embodiments of the present invention to configurations where the openings 505 are orientated substantially perpendicular to the adjacent wall of the plenum 70. Embodiments of the present invention may also incorporate configurations where the openings 505 are not orientated substantially perpendicular to the adjacent wall of the plenum 70.

Figure 5:
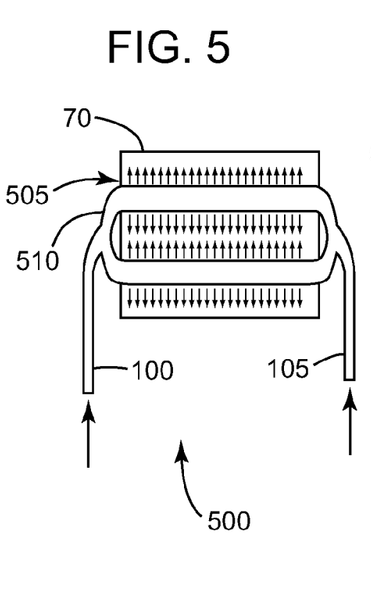
FIG. 5 is a schematic illustrating an IBH manifold, in accordance with a first embodiment of the present invention.

FIG. 5 is a schematic illustrating an IBH manifold 500, in accordance with a first embodiment of the present invention. The IBH manifold 500 comprises a plurality of outlet openings 505 in an arrangement that may discharge the heated extraction air along a substantially horizontal plane within the plenum 70. As illustrated in FIG. 5, the two conduits 100,105 may be fluidly connected in a manner that forms an integrated structure 510. Here, the plurality of outlet openings 505 may be arranged around the structure 510. In an embodiment of the present invention, the structure 510 may comprise at least one straight segment connected by at least one curved segment, as illustrated in FIG. 5. However, other embodiments of the structure 510 may comprise a different shape that performs the same function.

Figure 6:
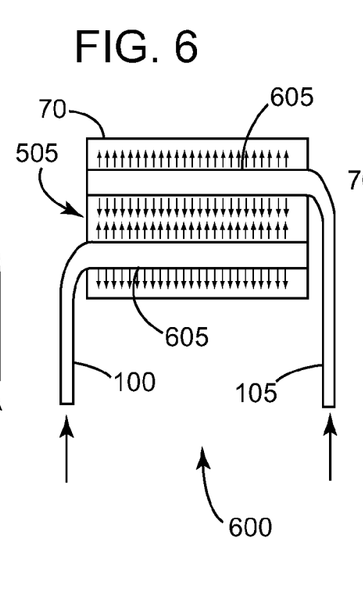
FIG. 6 is a schematic illustrating an IBH manifold, in accordance with a second embodiment of the present invention.

FIG. 6 is a schematic illustrating an IBH manifold 600, in accordance with a second embodiment of the present invention. The IBH manifold 600 comprises a plurality of outlet openings 505 in each of the two conduits 100,105 in an arrangement that may discharge the heated extraction air along a substantially horizontal plane within the plenum 70. As illustrated in FIG. 6, each conduit 100, 105 may include a leg portion 605 that extends throughout the horizontal plane of the plenum 70. Here, the plurality of outlet openings 505 may be arranged around the each leg portion 605. In an embodiment of the present invention, each leg portion 605 may be positioned in a substantially parallel arrangement relative to the other leg portion 605. However, other embodiments of the manifold 600 may comprise a different shape that performs the same function.

Figure 7:
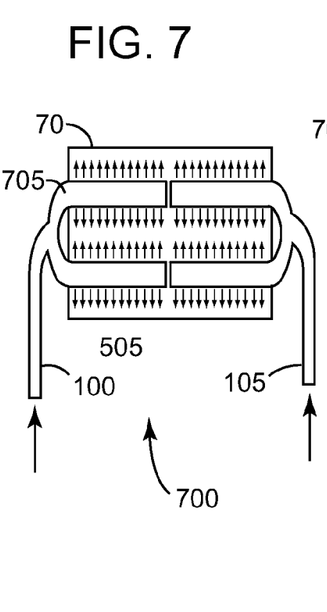
FIG. 7 is a schematic illustrating an IBH manifold, in accordance with a third embodiment of the present invention.

FIG. 7 is a schematic illustrating an IBH manifold 700, in accordance with a third embodiment of the present invention. The IBH manifold 700 may comprise a plurality of outlet openings 505 in each of the two conduits 100,105 in an arrangement that may discharge the heated extraction air along a substantially horizontal plane within the plenum 70. As illustrated in FIG. 7, each conduit 100,105, may be fluidly connected by a split-structure 705; which may comprise a straight segment and a curved segment. In an embodiment of the present invention, the plurality of outlet openings 505 may be arranged around the split-structure 705. However, other embodiments of the split-structure 705 may comprise a different shape that performs the same function.

Figure 8:
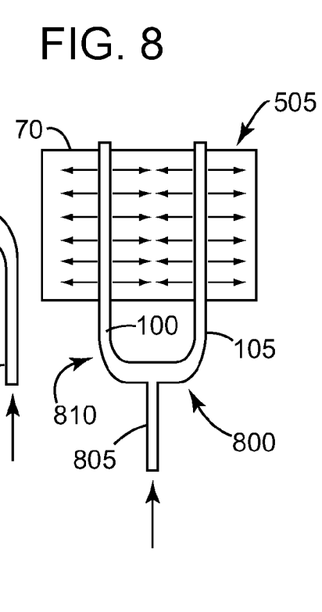
FIG. 8 is a schematic illustrating an IBH manifold, in accordance with a fourth embodiment of the present invention.

FIG. 8 is a schematic illustrating an IBH manifold 800, in accordance with a fourth embodiment of the present invention. The IBH manifold 800 may comprise a plurality of outlet openings 505 in each of the two conduits 100,105 in an arrangement that may discharge the heated extraction air along a substantially vertical plane within the plenum 70. As illustrated in FIG. 8, each conduit 100, 105, may be arranged in a U-shaped form 810 and fluidly connected by a supply conduit 805. In an embodiment of the present invention the plurality of outlet openings 505 are arranged around the U-shaped form 810. However, other embodiments of the present invention may comprise a different shape that includes vertical portions and performs the same function.

As described herein specific embodiments of the present invention comprises two conduits 100,105 and plurality of outlet openings 505. The physical characteristics and dimensions of the conduits 100,105 and plurality of outlet openings 505 may vary based on the configuration and size of the associated combustion turbine engine 10. Embodiments of the present invention are intended to cover the wide range of dimensions required for each configuration and size of the associated combustion turbine engine 505.

Although specific embodiments have been illustrated and described herein, those of ordinary skill in the art appreciate that any arrangement, which is designed to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

As one of ordinary skill in the art will appreciate, the many varying features and configurations described above in relation to the several embodiments may be further selectively applied to form other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A system comprising:
a compressor including a compressor inlet and a compressor extraction outlet;
an inlet system fluidly connected to the compressor, the inlet system including:
a plenum including a first end portion that extends to a second end portion through an intermediate portion; the first end portion is orientated in a direction substantially parallel to a centerline of the compressor and defines an inlet for receiving ambient air; and the second end portion is orientated in a direction substantially perpendicular to the centerline of the compressor and defines an outlet that directs the ambient air towards the compressor inlet; and
a silencer fluidly connected within the inlet system and orientated such that an upstream portion faces the first end portion and a downstream portion faces the second end portion; and
a heating system including two conduits located within the second end portion and adjacent to the silencer, wherein the two conduits extend horizontally through the second end portion and are arranged in a substantially horizontal relationship, each conduit includes a first end section, a second end section and an intermediate section, at least one of the first and second end sections is fluidly connected to the compressor extraction outlet, wherein heated air from the compressor extraction outlet passes through the two conduits and raises a temperature of ambient air passing through the plenum and then into the compressor inlet, wherein each of the two conduits includes a plurality of outlet openings through which the heated air from the compressor extraction outlet flows into the plenum, and wherein each of the two conduits includes a leg portion that extends throughout the horizontal plane of the plenum.

2. The system of claim 1, wherein the plurality of outlet openings in each of the two conduits are orientated in a manner substantially perpendicular to an adjacent wall of the plenum.

3. The system of claim 2, wherein the two conduits are fluidly connected by a structure that comprises a straight segment and a curved segment.

4. The system of claim 3, wherein the plurality of outlet openings are arranged around the structure.

5. The system of claim 1, wherein at least one of the conduits is orientated at an angle relative to a vertical wall of the second portion, and the angle comprises a range of up to 90 degrees.

6. The system of claim 1, wherein the two conduits are arranged in a manner that operatively promotes a substantially uniform mixing between the ambient air and the heated air.

7. The system of claim 1, wherein the plurality of outlet openings are arranged around each leg portion.

8. The system of claim 1, wherein the two conduits are fluidly connected by a split-structure that comprises a straight segment and a curved segment.

9. The system of claim 8, wherein the plurality of outlet openings are arranged around the split-structure.

10. The system of claim 1, wherein the two conduits are arranged in a U-shaped form and fluidly connected to a supply conduit.

11. The system of claim 10, wherein the plurality of outlet openings are arranged around the U-shaped form.

12. The system of claim 1, further comprising a distance T between the two conduits and a downstream end of the inlet silencer, wherein distance T may comprise a range of up to 10 inches.

13. The system of claim 1, wherein the silencer is located within the plenum.

14. A turbomachine comprising:
a compressor including: a compressor inlet, a compressor extraction outlet, and inlet guide vanes;
a turbine section fluidly located downstream of the compressor extraction outlet;
an inlet system fluidly connected to the compressor, the inlet system including:
an inlet filter house that receives ambient air;
a plenum fluidly connected to an aft end of the inlet filter house, wherein the plenum includes a first end portion that extends to a second end portion through an intermediate portion; the first end portion is orientated in a direction substantially parallel to a centerline of the compressor and defines an inlet for receiving the ambient air; and the second end portion is orientated in a direction substantially perpendicular to the centerline of the compressor and defines an outlet that directs the ambient air towards the compressor inlet; and
a silencer fluidly connected within the inlet system and orientated such that an upstream portion faces the first end portion and a downstream portion faces the second end portion; and
a heating system including two conduits located within the second end portion and adjacent to the silencer, wherein the two conduits extend horizontally through the second end portion and are arranged in a substantially horizontal relationship, each conduit includes a first end section, a second end section and an intermediate section, at least one of the first and second end sections is fluidly connected to the compressor extraction outlet, wherein heated air from the compressor extraction outlet passes through the two conduits, raising a temperature of ambient air passing through the plenum and then into the compressor inlet, wherein the two conduits are fluidly connected by a structure that comprises a straight segment and a curved segment, and wherein each of the two conduits includes a leg portion that extends throughout the horizontal plane of the plenum, wherein each leg portion is positioned in a substantially parallel arrangement relative to the other leg portion.

15. The system of claim 14, wherein each of the two conduits includes a plurality of outlet openings through which passes the heated air from the compressor extraction outlet into the plenum.

16. The turbomachine of claim 15, wherein the plurality of outlet openings in each of the two conduits are arranged to discharge heated extraction air along a substantially horizontal plane within the plenum and in a manner substantially perpendicular to an adjacent wall of the plenum.

17. The turbomachine of claim 14, wherein the two conduits are fluidly connected by a split-structure that comprises a straight segment and a curved segment.

18. The turbomachine of claim 17, wherein the two conduits are arranged in a U-shaped form and fluidly connected to an inlet pipe.

19. The turbomachine of claim 14, further comprising a distance T between the two conduits and a downstream end of the inlet silencer, wherein distance T may comprise a range of up to 10 inches.

20. The system of claim 14 wherein at least one of the conduits is orientated at an angle relative to a vertical wall of the second portion and the angle comprises a range of up to 90 degrees.

21. The system of claim 14, wherein the two conduits are arranged in a manner that operatively promotes a substantially uniform mixing between the ambient air and the heated air.

22. The system of claim 14 wherein the silencer is located within the plenum.

* * * * *

UNITED STATES PATENT AND TRADEMARK OFFICE
CERTIFICATE OF CORRECTION

PATENT NO.        : 8,932,004 B2
APPLICATION NO.   : 13/291201
DATED             : January 13, 2015
INVENTOR(S)       : Ponyavin et al.

Page 1 of 1

It is certified that error appears in the above-identified patent and that said Letters Patent is hereby corrected as shown below:

On the title page item (73), under "Assignee", in Column 1, Line 2,
delete "Schnectady," and insert -- Schenectady, --, therefor.

In the specification,

In Column 7, Line 6, delete "engine 505." and insert -- engine 10. --, therefor.

In the claims,

In Column 9, Line 14, in Claim 15, delete "system of" and
insert -- turbomachine of --, therefor.

In Column 10, Line 11, in Claim 20, delete "system of" and
insert -- turbomachine of --, therefor.

In Column 10, Line 16, in Claim 21, delete "system of" and
insert -- turbomachine of --, therefor.

In Column 10, Line 20, in Claim 22, delete "system of" and
insert -- turbomachine of --, therefor.

Signed and Sealed this
Twenty-eighth Day of April, 2015

Michelle K. Lee
*Director of the United States Patent and Trademark Office*